Aug. 27, 1968  B. E. DOZER  3,398,578
SELF-CALIBRATING LIQUID-LEVEL-MEASURING DEVICE
Filed Jan. 24, 1966  2 Sheets-Sheet 2

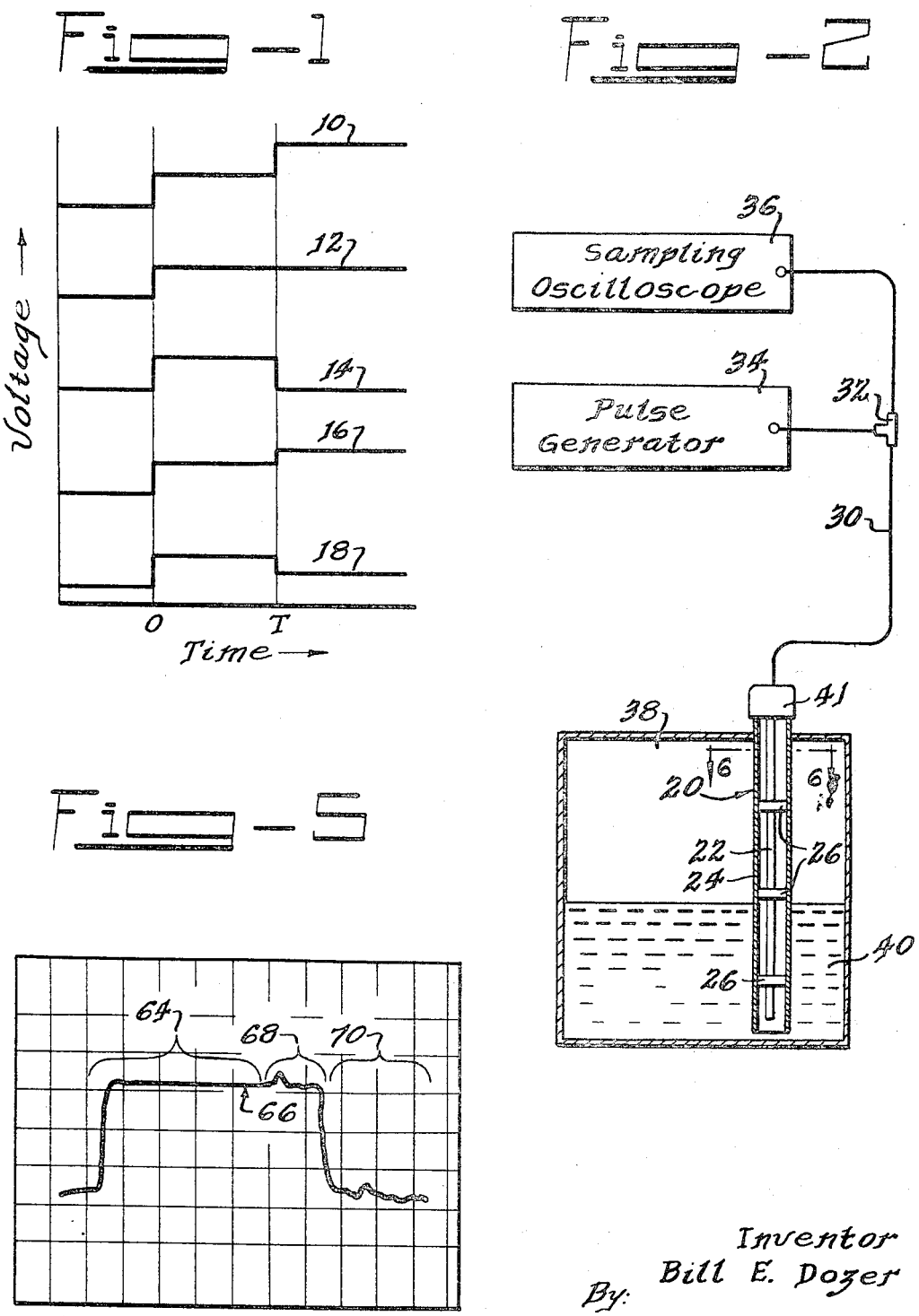

Inventor
Bill E. Dozer
By: Robert A. Anderson
Attorney

_United States Patent Office_

3,398,578
Patented Aug. 27, 1968

3,398,578
SELF-CALIBRATING LIQUID-LEVEL-
MEASURING DEVICE
Bill E. Dozer, Richland, Wash., assignor to the United
States of America as represented by the United States
Atomic Energy Commission
Filed Jan. 24, 1966, Ser. No. 522,797
4 Claims. (Cl. 73—304)

ABSTRACT OF THE DISCLOSURE

A liquid-level-measuring device has a pair of members coaxially mounted with respect to each other to form a hollow transmission line probe in contact with the liquid. A pulse generator applies a pulsed signal to the members and an oscilloscope measures signals reflected from the members. A plurality of insulators are spatially disposed with respect to each other along the length of the probe. Each of the insulators is shaped to surround the inner member and contact both the inner and outer members of the probe, while permitting flow therebetween of the liquid. A portion of the applied pulsed signal is reflected by each of the insulators to provide calibration marks for the probe.

---

The invention described herein was made in the course of, or under, a contract with the United States Atomic Energy Commission.

This invention relates to an apparatus for measuring the level of a liquid.

There are many devices which are presently available for measuring the level of a liquid both in accessible and in inaccessible locations. However, one encounters difficulty in measuring liquid levels wherein the liquid is operating at a high temperature or in the presence of a high radiation field. The prior-art devices generally prove unsatisfactory in providing remote liquid-level measurements under these conditions. Further, no present existent liquid-level-measuring device incorporates a self-calibrating feature.

Accordingly, it is one object of the present invention to provide an improved apparatus for the measurement of the level of a liquid.

It is another object of the present invention to provide an apparatus which is essentially self-calibrating and which is capable of measuring the level of a liquid.

It is another object of the present invention to provide an apparatus for measuring the level of a liquid which is operated at high temperatures (approximately 1000° C.) and/or contained in the presence of high radiation fields.

It is another object of the present invention to provide an apparatus which is capable of measuring the level of a liquid within a resolution of approximately one inch wherein said liquid is operated at high temperatures (approximately 1000° C.) and/or in a high radiation field.

Other objects of the present invention will become more apparent as the detailed description proceeds.

In general, the present invention comprises a coaxial transmission line probe mounted substantially normal to the surface of the liquid to be monitored and engageable therewith. Means are provided for applying a pulsed electrical signal to the probe and for monitoring reflections of the applied signal from the probe, which signal reflections are a measure of the level of the liquid.

Further understanding of the present invention may best be obtained from consideration of the accompanying drawings wherein:

FIG. 1 is a graphical illustration of theoretical waveforms generated by various transmission lines;

FIG. 2 is a schematic diagram of an apparatus for the practice of the present invention;

FIG. 6 is a view of a portion of the apparatus of FIG. 2 along line 6—6.

Figure 3A:
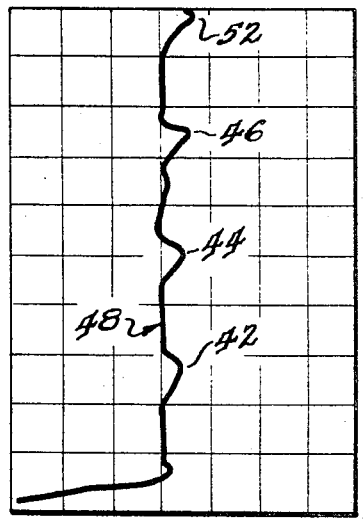
FIG. 3 is an expanded oscilloscope display from the apparatus of FIG. 2 during operation thereof.

In order to facilitate understanding of the present invention, the general theory thereof will be described. The voltage introduced at the generator-end of a transmission line will require a finite time to travel down the line. The velocity, called the velocity of propagation, can be determined from $$Vp = Vc/\sqrt{K} \qquad (1)$$

where:

$Vp$ = velocity of propagation
$Vc$ = velocity of light
$K$ = the dielectric constant of the insulating material.

If this voltage travels down the line and is reflected at the end and returns, the length of the line can be determined by $$D = VpT/2 \qquad (2)$$

where:

$D$ = line length
$T$ = transit time down the line and back.

For an air dielectric, this length becomes $$D = 1.5 \times 10^{10} T \text{ centimeters} \qquad (3)$$

If the line is assembled using series inductances, series resistances, and shunt capacitances and conductances, then a value called the "characteristic impedance" of the transmission line may be defined as $$Z_0 = \sqrt{\frac{R + jwL}{G + jwC}} \qquad (4)$$

where:

$Z_0$ = characteristic impedance
$L$ = inductance per unit line length
$C$ = capacitance per unit line length
$R$ = resistance per unit line length
$G$ = conductance per unit line length.

If the line is terminated in its characteristic impedance, a signal propagated down the line will be totally absorbed in this termination. If the termination is different from $Z_0$, a portion of this signal will be reflected. The ratio of the reflected to incident signal is given by $$\rho = \frac{E_r}{E_i} = \frac{Z_L - Z_0}{Z_L + Z_0} \qquad (5)$$

where:

$Z_L$ = termination impedance
$E_r$ = reflected voltage
$E_i$ = incident voltage
$\rho$ = reflection coefficient.

The theoretical waveforms resulting from a very long, zero rise time, positive square voltage pulse from a generator are shown in FIG. 1. The time T indicated in FIG. 1 is the propagation time required for the voltage to travel down the transmission line to be reflected at the end and returned to the generator. The waveform 10 is for a transmission line having an infinite termination impedance. Waveform 12 is for a transmission line having a termination impedance equal to the characteristic impedance of the transmission line. Waveform 14 is for a transmission line having a termination impedance equal to zero. Waveform 16 is for a transmission line having a termination impedance greater than the characteristic impedance of the transmission line. Waveform 18 is for a transmission line having a termination impedance which is less than the characteristic impedance of the transmission line.

The application of the aforedescribed theory to the present invention is shown in FIG. 2. The liquid-level-detection probe 20 comprises an inner conductor 22 and an outer coaxial conductor 24. The inner conductor 22 is spaced from the outer conductor 24 by a plurality of insulators 26. In the embodiment of FIG. 1, three insulators 26 are shown spaced ¼, ½ and ¾ along the full length of the probe 20. The insulators 26 are formed so that they permit the passage of the liquid between the two conductors 22 and 24 as shown in FIG. 6. The probe 20 is connected via a coaxial transmission line 30 and a T 32 to a pulse generator 34 and a sampling oscilloscope 36. The probe 20 is mounted within a container 38 housing the liquid 40 so that the longitudinal axis of the probe 20 is essentially normal to the surface of the liquid. The upper part of the probe may be sealed to prohibit the escape of noxious fumes or other undesirable elements, if desired. However, such does not form an essential part of the present invention.

In operation, the pulse generator 34 transmits a pulse along the coaxial cable 30 through a coupling connector 41 to the probe 20. The insulators 26 in the probe 20 change the characteristic line impedance $Z_0$ at points along the probe, because they form a different dielectric constant and shunt conductance. These insulators 26 cause small "bumps" to appear on the oscilloscope display of the transmitted pulse and serve as built-in calibration marks for the probe 20. If the liquid 40 within container 38 is an electrically conducting liquid, such as water, the inner and outer conductors 22 and 24, respectively, will be shorted and the probe 20 therefor "shorted out" at the surface of the liquid. The "shorting out" of the probe 20 along the length thereof, as changes in the level of liquid 40 occur, changes the termination impedance $Z_L$ of the probe 20. If a nonconducting liquid 40 is used in container 38, then "shorting out" of the probe does not occur. However, the nonconducting liquid 40 forms a different dielectric constant and shunt impedance, thereby affecting the characteristic line impedance $Z_0$. Both the conducting and nonconducting liquid effects on the $Z_L$ and $Z_0$ impedances are detectable on the oscilloscope to give a measure of the height of the liquid 40 in the container 38.

It is to be noted that the material of the conductors 22 and 24 is not critical, but may be of a material such as copper, aluminum or stainless steel, depending upon the application required. Further, it is to be noted that, though the embodiment of FIG. 1 illustrates insulators 26 between the inner and outer conductors 22 and 24, such is not necessary for the practice of the present invention. The insulators 26 serve as self-calibrating markers as well as positioning the center conductor 22 with respect to the outer conductor 24. If it is not desired to use centering devices, such as insulators 26, they may be replaced by other devices which do not contact the outer conductor 24. It is to be noted that these devices, if centering is not required, may be of a conducting or nonconducting material, since either material will change the characteristic impedance $Z_0$ of the probe 20 at the location where they are mounted.

Figure 3B:
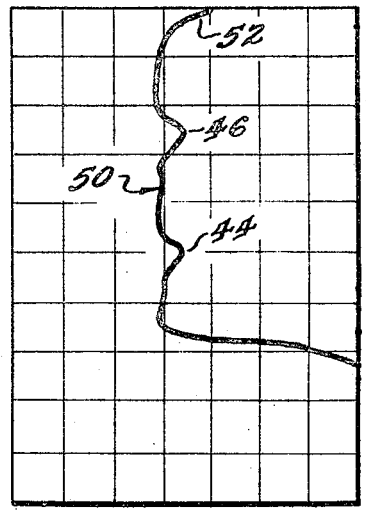

Turning to FIG. 3, readout from oscilloscope 36 for the apparatus of FIG. 1 is shown. An 83-inch coaxial probe 20 having an outer conductor 24 of one-inch stainless-steel pipe and an inner conductor 22 of ¼-inch stainless-steel rod were used. Calibration marks 42, 44, 46 resulted from ¾-inch thick triangularly shaped lavite-insulated spacers held in place with ½-inch diameter by ⅜-inch long stainless-steel collars. These insulators were spaced ¼, ½ and ¾ along the full distance of the probe length. The trace 48 of FIG. 3A shows the return received with the container 38 empty. The trace 50 in FIG. 3B shows the return received with the container filled with tap water to a level just covering the bottom spacer (approximately ¼ full). For the presentations of FIG. 3, a negative pulse from generator 34 was used. The portion of the reflected signal resulting from the coaxial cable 30 is not seen, since the oscilloscope presentation was expanded and shifted to eliminate the cable section of the trace. The small bump 52 at the top of the traces 48 and 50 represents the return from a seal and connector 41 at the top of the probe 20. It is readily apparent from the traces 48 and 50 that one may ascertain the level of the liquid as it rises in the container 38, since such visibly affects the display signal of oscilloscope 36.

Figure 4A:
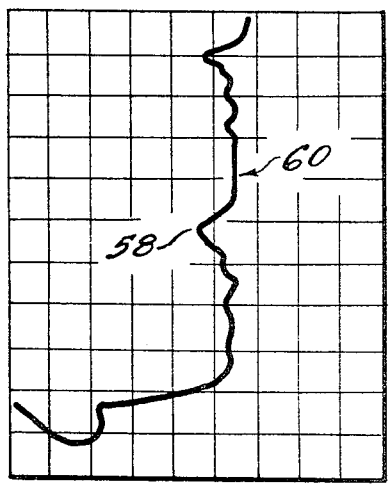
FIG. 4 is an expanded oscilloscope display from the apparatus of FIG. 2 during operation thereof.
Figure 4B:
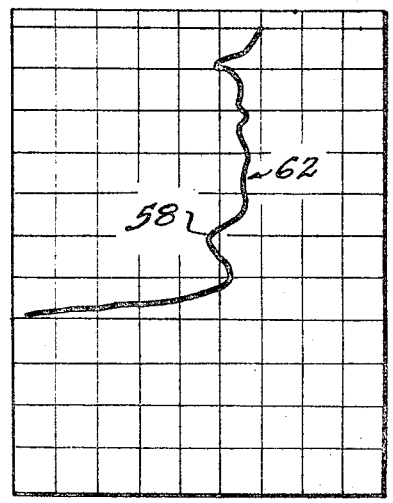

Turning to FIG. 4, a presentation is shown for the apparatus of FIG. 1 using a 24-inch probe constructed from $\frac{1}{16}$-inch wall, one-inch O.D. stainless-steel tubing and ⅜-inch O.D. stainless-steel rod. In this embodiment, the rod and the tubing were shorted permanently at the end thereof. A ¼-inch stainless-steel washer was mounted halfway along the stainless-steel inner rod. The diameter of the washer was such that it did not contact the outer stainless-steel tubing. A positive pulse was used for the 24-inch probe and resulted in a signal pattern on the oscilloscope 36 which was opposite to that shown in FIG. 3. The calibration mark due to the stainless-steel washer is shown at point 58 on traces 60 and 62 in FIGS. 4A and 4B. The trace 60 in FIG. 4A results from the container 38 being empty. The trace 62 in FIG. 4B results from the container 38 having 8 inches of water therein. As for FIG. 3, FIG. 4 is not a representation of the full return trace on oscilloscope 36. The oscilloscope presentation was expanded and shifted to eliminate the cable section of the trace.

Figure 5:
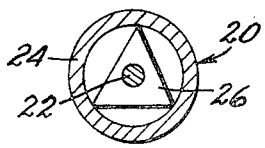
FIG. 5 is a full oscilloscope display from the apparatus of FIG. 2 during operation thereof.

A full oscilloscope presentation of the 24-inch probe is shown in FIG. 5. The section 64 of trace 66 results from the 6½-foot transmission line used to connect the probe to the oscilloscope 36 and generator 34. The section 68 of trace 66 represents the return due to the 24-inch probe which is shown in expanded form in FIG. 4. The section 70 of trace 66 is caused by secondary reflections of the returning wave front encountering discontinuities.

For the 83-inch probe of FIG. 3, a mercury relay pulser was used for generator 34 and a 400-picosecond sampling oscilloscope was used for oscilloscope 36. For the 24-inch probe of FIG. 4, a tunnel diode pulser was used for generator 34 and an oscilloscope having a rise time of 150 picoseconds was used for the oscilloscope 36. The faster rise time system can be used to measure smaller changes in the level of the liquid 40. For resolution of distances of about one inch, the equipment rise time must be approximately $.2 \times 10^{-9}$ seconds (200 picoseconds). This may be determined from the hereinbefore-described equation $D = 1.5 \times 10^{10} T$ centimeters. The equation is solved for T with 30.48 centimeters (one foot) substituted for D to give a value of approximately $2 \times 10^{-9}$ sec./ft. for T. Thus, for one-inch resolution, the rise time of the equipment must be approximately 200 picoseconds.

The embodiment of FIG. 1 has been successfully used to measure the level of molten glass at 1000° C. and in areas of high radiation. It is able to give a reliable and accurate designation within one inch of the level of a liquid located apart from the indicating instruments.

Persons skilled in the art will, of course, readily adapt the general teachings of the invention to embodiments far different than the embodiments illustrated. Accordingly, the scope of the protection afforded the invention should not be limited to the particular embodiment illustrated in the drawings and described above, but should be determined only in accordance with the appended claims.

What is claimed is:
1. A liquid-level-measuring device comprising a first electrically conductive tubular member; a second electri- cally conductive member mounted coaxially within said first member and spaced therefrom to form a coaxial transmission line probe; a plurality of triangularly shaped insulators each disposed at approximately equal intervals along the length of said first member, each of said insulators surrounding said second member in contact therewith, said insulators being sized such that the apices thereof contact said second member, means for mounting said transmission line probe with the longitudinal axis thereof essentially normal to the surface of said liquid and engageable therewith and means for measuring the impedance of said transmission line, which impedance is a measure of the level of said liquid.

2. The device according to claim 1 wherein said impedance-measuring means comprise means for generating an electrical pulse, means for applying said electrical pulse to said coaxial transmission line probe, and means for measuring reflections of said applied signal from said coaxial transmission line probe, which signal reflections are a measure of the level of said liquid.

3. A liquid-level-measuring device comprising a first electrically conductive member, a second electrically conductive member mounted coaxially within said first member and spaced therefrom to form a coaxial transmission line probe, means for mounting said probe with the longitudinal axis thereof essentially normal to the surface of said liquid and engageable therewith, means for applying a pulsed electrical signal to said members, means for measuring reflections of said applied signal from said members to provide a measure of the level of said liquid, and a plurality of elements spatially disposed with respect to each other along the length of said second member, each of said elements surrounding said second member in contact therewith and being spaced from said first member, each of said elements reflecting a portion of said applied signal to provide calibration marks for said measuring means.

4. A liquid-level-measuring device comprising a first electrically conductive tubular member, a second electrically conductive member mounted coaxially within said first member and spaced therefrom to provide a coaxial transmission line probe, means for mounting said coaxial transmission line probe normal to the surface of said liquid and engageable therewith, means for applying a pulsed electrical signal to said members, means for measuring reflections of said applied signal from said members to provide a measure of the level of said liquid, and a plurality of insulators spatially disposed with respect to each other along the length of said second member, each of said insulators surrounding said second member in contact therewith and in contact with said first member, each of said insulators being shaped to permit the flow of said liquid between said insulators and said first member, whereby a portion of said applied signal is reflected by each insulator to provide calibration marks for said measuring means.

References Cited
UNITED STATES PATENTS

| | | | |
|---|---|---|---|
| 2,525,893 | 10/1950 | Gloess. | |
| 3,208,281 | 9/1965 | Kalmus et al. | 73—313 |
| 3,296,862 | 1/1967 | Ziniuk | 73—290 |
| 3,321,971 | 5/1967 | Llewellyn et al. | 73—304 |

DAVID SCHONBERG, *Primary Examiner.*

DONALD O. WOODIEL, *Examiner.*